RECORD MEANS AND METHOD OF MAKING SAME

Filed June 18, 1962

INVENTOR.
DAVID W. SEYMOUR
BY William R. Nolte
AGENT

United States Patent Office 3,132,962
Patented May 12, 1964

3,132,962
RECORD MEANS AND METHOD OF MAKING SAME

David W. Seymour, King of Prussia, Pa., assignor to Burroughs Corporation, Detroit, Mich., a corporation of Michigan Filed June 18, 1962, Ser. No. 203,175
16 Claims. (Cl. 117—9)

This invention pertains to the art of embossing records which may be read by the sense of touch, and particularly to the production of records in the coded system known as Braille. This application is a continuation in part of application for U.S. patent Serial No. 857,826, filed December 7, 1959, in the name of David W. Seymour, entitled "Record Means and Method," and now abandoned.

It is conventional to produce records which may be read by the sense of touch by embossing dots upon a medium, usually but not necessarily a sheet of heavy paper, the dots being raised sufficiently above the surface of the paper so that they may be felt by the exploring fingers of the reader. This procedure, while highly conventional suffers from the disadvantage that the dots exist only because of a deformation of the paper, and repeated readings cause them to be depressed until they can no longer be differentiated from the flat, unembossed surface of the medium, and the record thus becomes unreadable. It has been proposed by Jacquerod, in United States Patent 1,936,089, issued November 21, 1933, to remedy this difficulty by reinforcing the embossed dots by filling them with some substance which remains rigidly in the depression formed, on the reverse side of the medium, by the embossed dot. While the commercial success or failure of this proposal is not known, it appears to offer a solution to the immediate problem which is somewhat complex in application, and would add to the cost of an operation already rather costly. Even granting its effectiveness to achieve its limited objective, it does nothing to render the embossed dots any more easy to identify than are the dots in a freshly embossed conventional Braille record.

My invention consists in embossing records by forcing into a surface of a medium, having a given smoothness and other tactually identifiable surface characteristics, particles of rigid material (such as clay or glass spheres) which, by wedging apart the surface of the medium where they enter it, spread the surface and cause it to buckle outward, forming a boss which is detectable by fingers (or by a sufficiently sensitive mechanical probe). The difference in surface characteristics, i.e. between smooth medium and relatively rough symbol or vice versa, is believed to facilitate the reading of the symbols, since the motion of a finger lightly in contact with the surface renders the roughness, as well as the elevation detectable.

A preferred method of practicing my invention to emboss a record member consists in the employment of electrostatic recording techniques for forming such a record. The advantages of the electrostatic process for recording at extremely high speeds render it both commercial and of military value. Such recording techniques comprise electrostatically adhering hard particles to discrete areas of one surface of a laminated record medium, wedging said particles into said one surface by the application of pressure, to thereby cause the laminated record medium to become embossed by virtue of outward buckling in the form of raised bosses of the record medium in said discrete areas.

In my copending application for United States patent, Serial Number 784,300, filed December 31, 1958, entitled "Electrostatic Recording," assigned to the assignee of this application, I teach the manufacture and use of a particulate developer or ink for rendering visible patterns of electrostatic charges, representative of symbols, formed upon a charge-retentive medium. Such ink is particularly well adapted to use in my present invention.

Thus my invention has a number of important objects, including, inter alia, the provision of an embossed record medium one form of which constitutes reading material for the sightless in a form more durable and easily read than that provided by the prior art, and the making available to the sightless of permanently recorded data by means suitable to record the output of modern computing and data-processing devices, and the provision for military and other special purposes of the output of a high-speed information recording device in a form capable of being read without the use of the eyes, although capable also of being read by conventional visual means. It will appear to those skilled in the art, either immediately or in the course of the following specification and description, that my invention fulfills other objects and possesses other advantages not specifically mentioned hereinabove.

For the better understanding of my invention I have provided figures of drawing as follows.

Figures 1, 3:
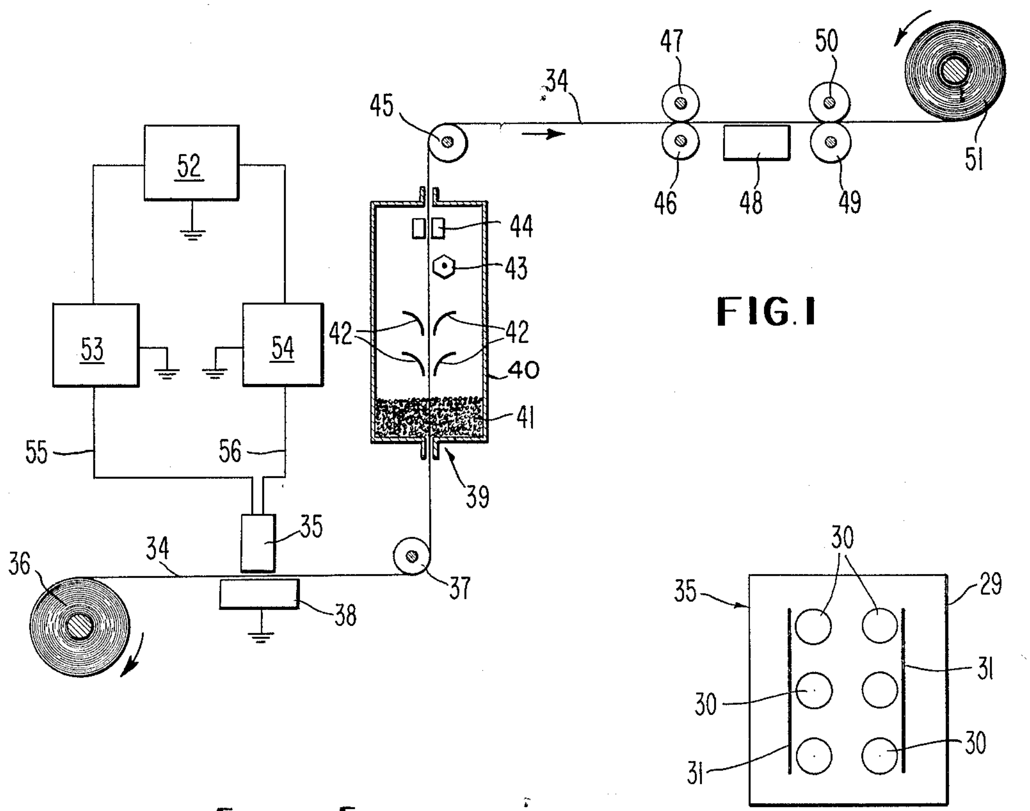
FIG. 1 represents one form of apparatus which is suitable for embossing characters upon a record medium.
FIG. 3 represents a print head for electrostatic embossing employed in the apparatus of FIG. 1.
Figure 2:
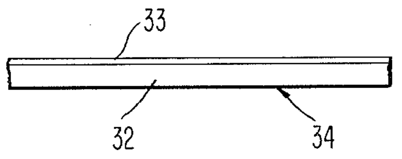
FIG. 2 represents a form of record medium suitable for embossing by the apparatus shown in FIG. 1.

Referring to FIGURE 1 of the drawing there is shown one form of electrostatic recording apparatus of the type similar to that described in detail in my copending application for United States patent Serial No. 784,300, entitled "Electrostatic Recording," filed December 31, 1958, by David Seymour, and assigned to the same assignee as the present application, and which may be used for embossing Braille symbols upon a strip of medium 34. FIGURE 2 of the drawing represents a laminar record medium 34 for electrostatic recording consisting of a base medium 32 and a surface layer 33, described in detail in application for United States patent Serial No. 714,767, entitled "Electrographic Recording Process," filed February 12, 1958, by Epstein and Benn, and assigned to the assignee of this application.

The record medium 34 of FIGS. 1 and 2 is a practically convenient form of a record member consisting of a plastic surface layer 33, and a thin, backing layer 32. A functionally satisfactorily, medium 34 having a paper backing may be made from a 32 pound super-calendered pouch plasticized with glycerine and urea nitrate, and coated on one side with a thin film which may be a resin, such as polyethylene, and having a high dielectric constant ("32 pound" means a basis weight of 32 pounds per ream, the ream basis in this case being 500 sheets each 24 inches by 36 inches, or a total of 3000 sq. ft.). The base layer 32 of pouch paper may be obtained commercially for instance from the Riegel Paper Corporation, Milford, New Jersey. This paper is characterized in particular by its high density and hardness, the result of the repeated application of high calendering pressures and plastic working of the paper structure by a super-calendering process which produces a relatively high Young's modulus relative to the plastic surface layer 33 bonded thereto. An example of an alternate satisfactory record medium 34 may be made from a backing layer 32 of cellophane which is relatively incompressible and which may likewise be bonded with a thin flexible continuous film of polyethylene as indicated above.

A supply reel 36, FIG. 1, rotating upon bearings not shown, carries a supply of medium 34 in strip form. Drive means not shown, which may consist conveniently of an electric motor and associated mechanical drive, cause take-up reel 51 to rotate counter-clockwise and draw medium 34 from supply reel 36, advancing it over a grounded support or anvil 38 and beneath print head 35. The electrode-bearing face of print head 35, which is presented to the viewer of FIG. 3 is, in FIG. 1, turned down to oppose anvil 38, forming the gap between which medium 34 is advanced. Medium 34 is oriented with the surface layer 33 up, nearest to the electrodes of head 35, and backing 32 down to contact with anvil 38. FIG. 3 represents an electrostatic printing head of a kind disclosed in more detail in application for United States patent Serial No. 734,253, entitled "Electrographic Recording Apparatus," filed May 9, 1958, by Benn-Howell-Sakurai, and assigned to the assignee of this application.

Printing head 35 of FIG. 3 is essentially a block of electrically insulating material 29, which may be a polymerizable organic plastic in which are embedded pin electrodes 30, insulated from each other by material 29 and each connected to separate electrical conductors brought out in the back of the head, and therefore not visible in the view of FIG. 3. Elongated or bar type electrodes 31 are mounted in the body of head 35 and may be connected together and brought to the outside of the head by a single common conductor like the conductors to electrodes 30. Each bar electrode 31 is located in proximity to a row of electrodes 30, forming a gap between each electrode 30 and its associated bar electrode 31.

The electrodes 30 of head 35, FIG. 1 are connected by individual conductors 55 to initiating pulse generator 53; and the electrodes 31 are connected by a common conductor 56 to print pulse generator 54. In actual application, the apparatus represented by rectangle 52 in FIG. 1 may consist of any of a large number of different kinds of components. For example, punched paper tape or magnetically recorded tape may carry the information to be reproduced, or a computer or data-processor may provide the information to be recorded. Such and many other pertinent devices are well known in the electrical art, and may be found described in the publications of the Institute of Radio Engineers of 1 East 79 Street, New York City, New York, which will serve as a guide to the numerous other sources of information on this vast subject. For the purposes of the present invention, all that is required of information source and control signal generator 52 is that it provide suitable signals to cause the associated pulse generators 53 and 54 to perform as hereinafter described. Print pulse generator 54 is characterized by a relatively low output impedance, and produces voltage pulses of a first polarity. Initiating pulse generator 53 consists of separately controllable high-impedance sources of voltage pulses of second polarity, opposite to the first polarity of the pulses produced by print pulse generator 54, there being one source for each electrode 30, each source being separately connected to one such electrode 30.

The actual deposition of electric charges in the charge retentive surface layer 33 of the record medium may be effected as follows: In response to control signals from source 52, initiating pulse generator 53 applies pulses of second polarity (e.g., positive) to those pin electrodes 30 which correspond to the dots to be recorded. Print pulse generator 54 then applies to electrodes 31 a voltage pulse of first polarity (e.g., negative), before the termination of the voltage pulses applied to the selected pin electrodes 30. The magnitude of the voltage pulses produced by generators 53 and 54 is so chosen that, when pulses from the two sources are coincident in time across a gap formed by an electrode 30 and an electrode 31, a disruptive electrical breakdown occurs, and an electric spark occurs. The flow of current in the discharge causes the potential across the gap to decrease as a consequence of the high impedance of the sources in generator 53, the potential of both sides of the gap tending to approach that of the pulse supplied by print pulse generator 54; in practice, a potential of 1000 volts is satisfactory for the pulse produced by print pulse generator 54, while the required amplitude of the initiating pulses from initiating pulse generator 53 is determined by the value of the print pulse and the geometry of print head 35. The ionized gases in the gap serve as a source of free ions and electrons; and, for the polarities chosen for the description, negatively charged particles are driven from the gap through the small distance to the surface of film 33 opposed to the particular gap of the head 35.

Since there is represented in FIG. 3 one pin electrode for each dot space required by the Braille code, it is apparent that any Braille character may be recorded as a charge pattern by suitable application of initiating pulses to the required initiating electrodes 30. The referenced patent application of Benn-Howell-Sakurai provides many details concerning such recording.

Since the operation of recording a pattern of spots may take place in less than a microsecond, it is feasible to move the medium 34 at constant speed, and cause recording of characters to take place at intervals synchronous with the advancing motion of medium 34. Alternatively, the drive means for rotating take-up reel 51 may be controlled by information source and control signal generator 52, by means well known in the computer and data-processing art, to cause the medium 34 to advance by a discrete amount, stop while a character pattern is recorded, and then advance and stop for another character to be recorded, and so continually.

After a desired charge pattern has been recorded on the film surface 33 of medium 34, the medium advances over idler roller 37 into developing station 39, which comprises a chamber 40 containing a quantity of dry powder particles 41. The bottom of chamber 40 is provided with an aperture, not designated, for the entrance of medium 34, and may be equipped with a felt or similar seal to prevent particles 41 from falling out. In passage upwardly through the mass of particles 41, the particles are attracted to and remain adherent to the deposited charges on the surface of film 33 after the medium 34 is removed from the mass of particles 41, thus delineating the charge pattern upon the surface of film 33. Baffles 42 are provided to prevent entrained particles of ink 41 from being carried upward with medium 34, and a polygonal rotating shaft 43, rotated by means not shown, conveniently an electric motor, agitates medium 34 to shake off any casually adhering particles 41 which may be held by random forces not produced by the deposited charge patterns. A vacuum exhaust hood 44 may also be provided to remove any loose particles of ink or other material which are too small and light to fall readily to the bottom of chamber 40.

In my above referred to copending application Serial No. 784,300, I describe the preparation of a particularly desirable form of particulate ink which may consist of substantially spherical non-friable particles of clay having a diameter range from twenty to eighty microns, preferably covered with a strongly colored and electrically conductive carbon coating which may be applied by heating the clay particles in the presence of a pyrolyzable hydrocarbon such as methane, causing decomposition of the hydrocarbon and deposition of carbon upon the clay particles. Clay particles such as here described are an article of commerce used in petroleum cracking as catalyst material, and generally described as fluid cracking catalysts. Developer or ink of this kind has the advantage that it may be affixed permanently to the surface of medium 34 by pressure.

After leaving developing station 39, the medium passes over idler 45 and is embossed by being passed between a pair of hardened steel rolls 46, 47. The rolls are adjusted in spacing so that they provide a gap sufficient for the medium 34 alone to pass through the gap without deformation, but small enough so that any particles of ink 41 adhering to the surface of medium 34 are embedded partially in the medium 34 and firmly held therein but leaving particles of ink protruding detectably above the top surface of film 33. Support 48 has been represented to indicate that, at this point in its progress, medium 34 bearing its pattern of raised bosses may be stopped so that it rests upon support 48 and may be read by application of the fingers of the reader to the developed particle pattern. Alternatively, medium 34 may pass between guide idlers 49 and 50, and be wound up and stored, for later reference, upon take-up reel 51.

Medium 34, as employed in practice, is sufficiently flexible that a number of layers of record, formed by medium 34 developed with subsequently pressure-fixed ink 41, may be stacked one on the other in such a number that the bosses described are compressed somewhat down into the general plane of the medium 34, forming a stack of height little greater than the height of a stack of an equal number of layers of unrecorded medium 34; but, when such stacks are taken apart for reading of a particular record, the bosses spring up again, rendering the recorded areas even more readily detectable by the fingers of a reader than they are by virtue of the roughness and the projection of the hard particles 41.

As was previously touched upon, it is desirable that the base sheet layer of the record medium be relatively thin so that the same have a sufficiently low beam strength to permit the record medium to flex readily so as to assume the bossed shape. A thick base layer would be stiff and it would be more difficult to dimple the backing layer to form bosses therein, while a thin backing layer such as formed by the super-calendering process mentioned above would be flexible and would more readily permit the formation of the bosses referred to above.

It is believed that the theory by which the raised bosses are formed in the record medium may be explained in the following manner: The hard particles 41 when forced into the plastic surface 33, displaced a volume of plastic layer 33 approximately equal to the volume of embedded particles 41. The displaced plastic is prevented from moving perpendicularly to the upper surface of layer 33 by the relatively incompressible roller 47 above, and by the base layer 32 beneath and therefore displaces laterally in the plane of the surface layer 33, tending to increase or enlarge the charge bearing surface area.

The expansion of this area is resisted by both the surrounding undeformed areas of surface 33 and by its bond to the relatively high tensile base layer 32. The forces thus built up by the laterally strained plastic surface are then relieved by an upward buckling of the entire medium 34, allowing the developed plastic areas to increase their surfaces relative to the high tensile base layer.

From the foregoing description it should be obvious that medium 33 must be capable of plastic deformation relative to base layer 32, and base layer 32 should have a greater Young's modulus than surface layer 33 to prevent it from increasing its area locally. It should be further observed that the base layer 32 is relatively incompressible with respect to surface layer 33 such that when the particles are wedged into the latter layer there is no necking down or reduction in cross-sectional area of the base layer 32 due to the compressive forces applied to the record 34 by rolls 46, 47. Both media should be thin enough to minimize beam strength; and surface layer 33 should not be appreciably thinner than the diameter of the embedded particles 41, while 34 should be thick enough to support the laminar buckling forces.

Reference to my copending application Serial No. 784,300, entitled "Electrostatic Recording," filed December 31, 1958, may provide a more detailed description of the printing mechanism for utilizing the invention of the present application. It is moreover known in the published art of general knowledge to develop patterns of electric charges by employment of a mixture of two or more materials which are triboelectric with respect to one another, acquiring charges of differing sign as a result of casual friction during handling. In the use of such material, ordinarily only the components carrying one sign of charge are used for development of the invisible charge pattern, and the component carrying the opposite sign of charge is left behind. It is possible to employ triboelectric mixtures in which the component actually used in developing the charge pattern is of a suitable size and mechanical properties for tactual detection; but the advantages of the conductive ink described in my referenced copending application are such that it is improbable that the use of triboelectric ink would be preferred, except in some peculiar circumstances.

It is also known in the art to attach ink to the surface of a dielectric medium consisting of a thermoplastic material by heating the medium sufficiently to soften it and calendering it between rolls; and it is also known to employ a thermoplastic material as ink and to soften such ink by heat and calender it to the surface of the charge-retentive medium upon which it has been attracted electrostatically. However, the use of the particulate ink described in my cited copending patent application above referenced is preferable because of the embossing effect described and because the hard discrete nature of the particles renders them much more easily detectable by touch for the purposes of the present application; and the avoidance of heat in fixing the developed image on the medium 34 is a great convenience favoring the use of pressure fixing.

Figure 4:
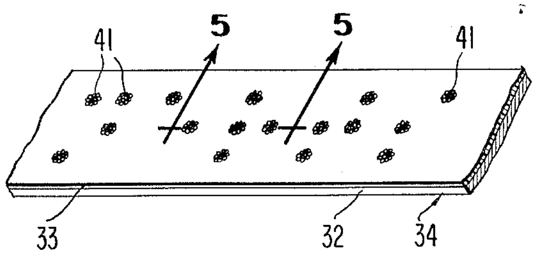
FIG. 4 represents an electrostatically embossed Braille record as produced by the apparatus of FIG. 1.
Figure 5:
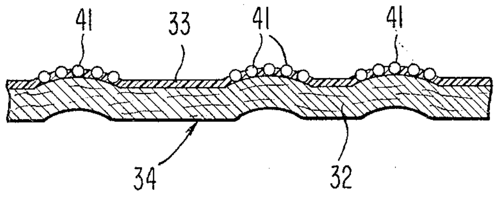
FIG. 5 is a sectional view, enlarged, taken along the line 5—5 of FIG. 4 of a portion of the record medium.

FIG. 4 represents pictorially a portion of medium 34 after it has passed through the apparatus of FIG. 1. Dots of particulate ink 41 are represented as embedded in the charge-retentive medium 33, which is represented above backing layer 32. FIG. 5 represents an enlarged section of medium 34, showing the embedded particles of ink 41, and representing clearly how they protrude detectably above the surface of layer 33.

The preceding description has been largely in terms of dots and the Braille code of letter and numerical symbols, because this is the most commonly used and best known mode of tactual presentation. It is clear that any other desired symbols may be formed by the process hereinabove described.

What I claim is:

1. A record readable by the sense of touch comprising a base medium and a surface layer thereon, said base medium being of thin, hard, high density material, and said surface layer having a greater degree of plasticity than said base layer, particles of greater hardness than said surface layer partially embedded in the latter and disposed in the patterns representative of information symbols, with portions of said medium coinciding with said patterns being buckled outwardly from the general plane of the medium in the direction of the side containing said surface layer.

2. A record medium readable by the sense of touch comprising an electrical charge retentive surface film bonded to a thin backing layer, said surface film being plastic relative to said backing layer and said backing layer being hard and having a high tensile strength relative to said surface layer, ink particles hard relative to said surface film and embedded in discrete areas in said surface film, said discrete areas of said surface film and areas of said backing layer coincident with said discrete areas, being convex in form and protruding from the general plane of said record medium in a direction from the side thereof bearing said surface film.

3. A Braille record medium readable by the sense of touch having a plurality of raised characters extending out of the general plane of said record medium, each character character being convex on the upper surface and concave on the lower surface of the record medium, and particles of a different surface roughness than said upper surface embedded in the convex portion of each character.

4. A Braille record medium readable by the sense of touch having a base layer and a surface layer bonded thereto, a plurality of raised characters extending out of the general plane of said record medium, each character being convex on the side of the surface layer and concave on the side of the base layer, and particles of a greater surface roughness than said surface layer embedded in the convex portion of each character.

5. A Braille record medium readable by the sense of touch having a base layer of cellophane and a surface layer of polyethylene, a plurality of raised characters extending out of the general plane of said record medium, each character being convex on the side of the surface layer and concave on the side of the base layer, and particles of greater hardness than said surface layer embedded in the convex portion of each character.

6. A method of embossing information on a record medium so that the same is readable by the sense of touch and wherein said record medium includes a thin base layer with an electrical charge retentive surface layer bonded thereto, said base layer being hard and relatively incompressible with respect to said surface layer and said surface layer having a greater degree of plasticity than said base layer, comprising the steps of electrically charging discrete areas on said surface layer in accordance with said information, passing said record medium through a rceeptacle containing particles more rigid than said surface layer, whereby said particles are caused to adhere to the charged discrete areas of the surface layer, removing excess particles not so adhered to said areas, and thereafter applying pressure to opposite surfaces of the record medium to force the particles so adhered into the surface layer to wedge apart the same without reducing the cross-sectional area of the base layer and to thereby cause said discrete charged areas and like areas of the base layer in contact with said charged areas to buckle outwardly from the general plane of the record medium and in the direction of the side thereof carrying said surface layer.

7. A method of embossing a laminate record medium comprising a hard base layer and an outer layer, the step of applying to selected areas of the outer layer of said record medium particles of material of greater hardness than said outer layer, the step of applying pressure simultaneously to said outer and base layers to force said particles into said outer layer whereby said record medium is caused to buckle outwardly adjacent said selected areas and in a direction opposite that in which said particles were pressed into said medium.

8. A method of embossing information on a record medium so that the same is readable by the sense of touch and wherein said record medium includes a thin base layer with an electrical charge retentive surface layer bonded thereto, said base layer being hard relative to said surface layer and said surface layer having a greater degree of plasticity than said base layer, comprising the steps of electrically charging discrete areas on said surface layer in accordance with said information, passing said record medium through a receptacle containing particles more rigid than said surface layer, whereby said particles are caused to adhere to the charged discrete areas of the surface layer, removing excess particles not so adhered to said areas, and thereafter applying pressure to opposite surfaces of the record medium to force the particles so adhered into the surface layer to wedge apart the same and to cause said discrete charged areas and like areas of the base layer in contact with said charged areas to buckle outwardly from the general plane of the record medium and in the direction of the side thereof carrying said surface layer.

9. A method of embossing information on a planar record medium so that the same is readable by the sense of touch and wherein said record medium includes a base layer and a surface layer having a high dielectric constant bonded thereto, said base layer having a greater Young's modulus than said surface layer and said surface layer having a greater degree of plasticity than said base layer, which process comprises supporting a print head having a plurality of pine electrodes in spaced relation relative to an anvil member so that the ends of the electrodes face a surface of the anvil, passing said record medium between the ends of said electrodes and said anvil so that the dielectric surface layer is in facing relation to said pin electrode ends, permutably energizing ones of said pin electrodes to produce electrical discharges therefrom to impress said dielectric surface with electrostatic latent images representative of Braille characters, passing said record medium through a receptacle containing hard particles more rigid than said surface layer, whereby said particles are caused to adhere to said electrostatic images, and thereafter applying pressure to force the hard particles so adhered into the surface layer to thereby simultaneously cause the latent images and like areas of the base layer coincident therewith to buckle outwardly from the plane of the record medium.

10. A method of embossing information on a record medium so that the same is readable by the sense of touch and wherein said record medium includes a base layer and a surface layer having a high dielectric constant bonded thereto, said base layer being relatively incompressible relative to said surface layer and said surface layer having a greater degree of plasticity than said base layer, which method comprises supporting a print head having a plurality of pin electrodes in spaced relation relative to an anvil member so that the ends of the electrodes face a surface of the anvil, passing said record medium between the ends of said electrodes and said anvil so that the dielectric surface layer is in facing relation relative to said pin electrode ends, permutably energizing ones of said pin electrodes to produce electrical discharges therefrom to impress discrete areas of said dielectric surface with electrostatic latent images representative of Braille characters, passing said record medium through a receptacle containing particles more rigid than said electrical charge retentive surface layer, to cause particles thereof to adhere to said discrete areas, removing excess particles not so adhered to said areas, and thereafter applying pressure to opposite surfaces of the record medium to partially embed and force the adhered particles into the charge retentive surface layer of the medium thereby compressing the base layer without reducing its cross-sectional area, whereby said record medium in areas coincident with said images is caused to buckle out of the general plane of said record medium.

11. A record readable by the sense of touch comprising a base medium and a surface layer thereon, said base medium being of hard material and said surface layer having a greater degree of plasticity than said base layer, particles of greater hardness than said surface layer partially embedded in the latter and disposed in patterns representative of information symbols, with portions of said medium coinciding with said patterns being buckled outwardly from the general plane of the medium in the direction of the side containing said surface layer.

12. A record medium readable by the sense of touch comprising an electric charge retentive surface film bonded to a backing layer, said backing layer being hard relative to said surface film and ink particles hard relative to said surface film and capable of carrying electric charges embedded in discrete areas in said surface film, and areas of said backing layer coincident with said discrete areas, being convex in form and protruding from the general plane of said record medium in a direction from the side thereof bearing said surface film.

13. An electric charge retentive planar record medium readable by the sense of touch comprising, a plurality of electrostatically chargeable particles hard with respect to said medium embedded into discrete areas thereon and adjacent one surface of said medium, said areas being representative of information, said record medium being deformed by having a concave depression in its other surface adjacent each area and by protruding outwardly from the general plane thereof in the direction toward the surface in which said particles are embedded.

14. A process of recording information on a record medium so that the same is readable by the sense of touch and wherein said record medium includes an electrically conductive base layer with an electrical charge retentive surface layer bonded thereto, said base layer being hard relative to said surface layer and said surface layer having a greater degree of plasticity than said base layer, comprising the steps of electrically charging discrete areas on said charge retentive surface layer in accordance with said information to thereby create induced charges in opposed areas in said conductive base layer, passing said record medium through a receptacle containing particulate ink formed of approximately spherical particles more rigid than said charge retentive surface layer, each particle coated with an electrically conductive coating thereon, whereby the induced charges in said conductive backing layer flow into the mass of spherical ink particles and cause particles thereof to adhere to the charged discrete areas thus making the record medium visible, removing excess ink particles not so adhered to said areas, and thereafter applying pressure to opposite surfaces of the record medium to force the ink particles so adhered into the charge retentive layer to wedge apart the same and to cause said discrete charged areas and like areas of the base layer in contact with said charged area to buckle outwardly from the general plane of the record medium and in the direction of the side thereof carrying said surface layer.

15. A process of recording information on a record medium so that the same is readable by the sense of touch and wherein said record medium includes a conductive base layer and an electrical charge retentive surface layer bonded thereto, said base layer being hard relative to said surface layer and said surface layer having a greater degree of plasticity than said base layer, which process comprises supporting a print head having a plurality of pin electrodes in spaced relation relative to an anvil member so that the ends of the electrodes face a surface of the anvil, passing said record medium between the ends of said electrodes and said anvil so that the dielectric surface layer is in facing relation relative to said pin electrode ends, permutably energizing ones of said pin electrodes to produce electrical discharges therefrom to impress said dielectric surface with electrostatic latent images representative of Braille characters and to thereby create induced charges in the opposed conductive base layer, passing said record medium through a receptacle containing particulate ink formed of approximately spherical particles more rigid than said electrical charge retentive surface layer, said particles having an electrically conductive coating thereon, whereby the induced charges in said conductive backing layer flow into the mass of spherical ink particles and cause particles thereof to adhere to said electrostatic latent images, removing excess ink particles not so adhered to said images, and thereafter applying pressure to opposite surfaces of the record medium to force the ink particles so adhered into the charge retentive layer to thereby simultaneously cause the latent images and like areas of the base layer coincident therewith to buckle outwardly from the plane of the record medium.

16. A process of recording information on a record medium so that the same is readable by the sense of touch and wherein said record medium includes a conductive base layer and an electrical charge retentive surface layer bonded thereto, said base layer being hard relative to said surface layer and said surface layer having a greater degree of plasticity than said base layer, which process comprises supporting a print head having a plurality of pin electrodes in spaced relation relative to an anvil member so that the ends of the electrodes face a surface of the anvil, passing said record medium between the ends of said electrodes and said anvil so that the dielectric surface layer is in facing relation relative to said pin electrode ends, permutably energizing ones of said pin electrodes to produce electrical discharges therefrom to impress discrete areas of said dielectric surface with electrostatic latent images representative of Braille characters and to thereby create induced charges in the opposed conductive base layer, passing said record medium through a receptacle containing particulate ink formed of approximately spherical particles more rigid than said electrical charge retentive surface layer, said particles having an electrically conductive coating thereon, whereby the induced charges in said conductive backing layer flow into the mass of spehrical ink particles and cause particles thereof to adhere to said discrete areas to make the same visible, removing excess ink particles not so adhered to said areas, and thereafter applying pressure to opposite surfaces of the record medium to partially embed and force the adhered particles of ink into the charge retentive surface layer of the medium to thereby cause said images to buckle out of the general plane of said record medium.

References Cited in the file of this patent

UNITED STATES PATENTS

| | | |
|---|---|---|
| Re. 6,039 | Blackham | Sept. 1, 1874 |
| 195,238 | Sawyer | Sept. 18, 1877 |
| 1,779,175 | Lindley | Oct. 21, 1930 |
| 1,936,089 | Jacqueford | Nov. 21, 1933 |
| 1,941,362 | Newcomb | Dec. 26, 1933 |
| 1,973,522 | Chaffee | Sept. 11, 1934 |
| 1,988,065 | Wooddell | Jan. 15, 1935 |
| 2,108,645 | Bryant | Feb. 15, 1938 |
| 2,143,946 | Hunter | Jan. 17, 1939 |
| 2,850,812 | Mannheimer | Sept. 9, 1958 |
| 2,851,373 | Tregay et al. | Sept. 9, 1958 |
| 2,866,279 | Surber | Dec. 30, 1958 |
| 2,895,847 | Mayo | July 21, 1959 |
| 2,919,672 | Benn et al. | Jan. 5, 1960 |
| 2,955,052 | Carlson et al. | Oct. 4, 1960 |
| 2,992,937 | Davis | July 18, 1961 |

FOREIGN PATENTS

| | | |
|---|---|---|
| 1,042,166 | France | June 3, 1953 |